(12) United States Patent
Aoyagi et al.

(10) Patent No.: US 12,463,005 B2
(45) Date of Patent: Nov. 4, 2025

(54) CORRECTION COEFFICIENT CALCULATION DEVICE, CORRECTION COEFFICIENT CALCULATION METHOD, AND CORRECTION COEFFICIENT CALCULATION PROGRAM

(71) Applicant: Hitachi High-Tech Corporation, Tokyo (JP)

(72) Inventors: Miki Aoyagi, Tokyo (JP); Masumi Shirai, Tokyo (JP); Kei Sakai, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 482 days.

(21) Appl. No.: 18/013,605

(22) PCT Filed: Jul. 16, 2020

(86) PCT No.: PCT/JP2020/027670
§ 371 (c)(1),
(2) Date: Dec. 29, 2022

(87) PCT Pub. No.: WO2022/014008
PCT Pub. Date: Jan. 20, 2022

(65) Prior Publication Data
US 2023/0343547 A1     Oct. 26, 2023

(51) Int. Cl.
*H01J 37/22*     (2006.01)
(52) U.S. Cl.
CPC .................... *H01J 37/222* (2013.01)

(58) Field of Classification Search
None
See application file for complete search history.

(56) References Cited

U.S. PATENT DOCUMENTS

| | | | |
|---|---|---|---|
| 2003/0039386 A1* | 2/2003 | Ishitani | H01J 37/263 382/141 |
| 2011/0278453 A1 | 11/2011 | Oosaki et al. | |
| 2012/0286160 A1 | 11/2012 | Ohashi et al. | |
| 2017/0092462 A1 | 3/2017 | Hatano et al. | |

(Continued)

FOREIGN PATENT DOCUMENTS

| | | | |
|---|---|---|---|
| JP | 2003-142021 A | 5/2003 | |
| JP | 2007-122995 A | 5/2007 | |

(Continued)

OTHER PUBLICATIONS

International Search Report (PCT/ISA/210) issued in PCT Application No. PCT/JP2020/027670 dated Oct. 6, 2020 with English translation (four (4) pages).

(Continued)

*Primary Examiner* — Dov Popovici
(74) *Attorney, Agent, or Firm* — Crowell & Moring LLP

(57) ABSTRACT

A defect inspection device calculates a machine difference correction coefficient for correcting a difference in the feature amount of a reference sample between devices. When a machine difference variation coefficient indicating the change over time in the feature amount of a calibration member is outside a threshold range, the defect inspection device recalculates the machine difference correction coefficient by using the feature amount of the calibration member.

13 Claims, 13 Drawing Sheets

(56) References Cited

U.S. PATENT DOCUMENTS

2019/0311875 A1    10/2019  Yamane et al.
2021/0125806 A1*    4/2021  Hamada ................ H01J 37/222

FOREIGN PATENT DOCUMENTS

| JP | 2012-234754 A | 11/2012 |
| JP | 2017-67451 A | 4/2017 |
| JP | 2019-185962 A | 10/2019 |
| WO | WO 2019/021536 A1 | 1/2019 |

OTHER PUBLICATIONS

Japanese-language Written Opinion (PCT/ISA/237) issued in PCT Application No. PCT/JP2020/027670 dated Oct. 6, 2020 (four (4) pages).

* cited by examiner

FIG. 4A

| | | DEVICE A | DEVICE B |
|---|---|---|---|
| DAY 0 (MACHINE DIFFERENCE CALIBRATION DAY) | FREQUENCY CHARACTERISTIC OF REFERENCE SAMPLE S | (1) $S_{A0}$ | (2) $S_{B0}$ |
| | REFERENCE FREQUENCY CHARACTERISTIC | (3) $S_{A0}$ (REFERENCE) | $S_{A0}$ (REFERENCE) |
| | FREQUENCY CHARACTERISTIC OF CALIBRATION MEMBER K IN EACH DEVICE | (4) $KA_{A0}$ | (5) $KB_{B0}$ |
| | CORRELATION COEFFICIENT C BETWEEN FREQUENCY CHARACTERISTIC OF REFERENCE SAMPLE S AND FREQUENCY CHARACTERISTIC OF EACH CALIBRATION MEMBER K | (6) $CA_0 = S_{A0}/KA_{A0}$ | (7) $CB_0 = S_{B0}/KB_{B0}$ |
| | CORRECTION COEFFICIENT X DURING SAMPLE IMAGE CORRECTION | (8) $XA_0 = S_{A0}/S_{A0} = S_{A0}/(KA_{A0} \times CA_0)$ | (9) $XB_0 = S_{A0}/S_{B0} = S_{A0}/(KB_{B0} \times CB_0)$ |

FIG. 4B

| | | DEVICE A | DEVICE B |
|---|---|---|---|
| DAY 1 | FREQUENCY CHARACTERISTIC OF CALIBRATION MEMBER K IN EACH DEVICE | (10) $KA_{A1}$ | (11) $KB_{B1}$ |
| | CORRELATION COEFFICIENT C BETWEEN FREQUENCY CHARACTERISTIC OF REFERENCE SAMPLE S AND FREQUENCY CHARACTERISTIC OF EACH CALIBRATION MEMBER K | (12) $CA_0$ | (13) $CB_0$ |
| | MACHINE DIFFERENCE VARIATION COEFFICIENT V | (14) $VK_{A1} = |KA_{A1} - KA_{A0}|$ | (15) $VK_{B1} = |KB_{B1} - KB_{B0}|$ |
| | COMPARISON AND DETERMINATION BETWEEN MACHINE DIFFERENCE VARITION COEFFICIENT AND THRESHOLD TV | (16) $VK_{A1} \leq TVA$ | (17) $VK_{B1} \leq TVB$ |
| | UPDATE OF CORRECTION COEFFICIENT X | (18) UNNECESSARY | (19) UNNECESSARY |
| | CORRECTION COEFFICIENT X DURING SAMPLE IMAGE CORRECTION | (20) $XA_0$ | (21) $XB_0$ |

FIG. 4C

|  |  | DEVICE A | DEVICE B |
|---|---|---|---|
| DAY 2 | FREQUENCY CHARACTERISTIC OF CALIBRATION MEMBER K IN EACH DEVICE | (22) $KA_{A2}$ | (23) $KB_{B2}$ |
|  | CORRELATION COEFFICIENT C BETWEEN FREQUENCY CHARACTERISTIC OF REFERENCE SAMPLE S AND FREQUENCY CHARACTERISTIC OF EACH CALIBRATION MEMBER K | (24) $CA_0$ | (25) $CB_0$ |
|  | MACHINE DIFFERENCE VARIATION COEFFICIENT V | (26) $VK_{A2} = |KA_{A2} - KA_{A0}|$ | (27) $VK_{B2} = |KB_{B2} - KB_{B0}|$ |
|  | COMPARISON AND DETERMINATION BETWEEN MACHINE DIFFERENCE VARITION COEFFICIENT AND THRESHOLD TV | (28) $VK_{A2} \leqq TVA$ | (29) $VK_{B2} > TVB$ (EXCEEDING THESHOLD) |
|  | COMPARISON AND DETERMINATION BETWEEN TOTAL VARIATION AMOUNT OF MACHINE DIFFERENCES FROM VALUE OF REFERENCE CALCULATION AND THRESHOLD TX | (30) $1-TX \leqq KA_{A0}/KA_{A2} \leqq 1+TX$ | (31) $1-TX \leqq KB_{B0}/KB_{B2} \leqq 1+TX$ |
|  | UPDATE OF CORRECTION COEFFICIENT A | (32) UNNECESSARY | (33) EXECUTED |
|  | CORRECTION COEFFICIENT X DURING SAMPLE IMAGE CORRECTION | (34) $XA_0$ | (35) $XB_2 = S_{A0}/S_{B2} = S_{A0}/(KB_{B2} \times CB_0)$ |

FIG. 4D

|  |  | DEVICE A | DEVICE B |
|---|---|---|---|
| DAY 3 | FREQUENCY CHARACTERISTIC OF CALIBRATION MEMBER K IN EACH DEVICE | (36) $KA_{A3}$ | (37) $KB_{B3}$ |
|  | CORRELATION COEFFICIENT C BETWEEN FREQUENCY CHARACTERISTIC OF REFERENCE SAMPLE S AND FREQUENCY CHARACTERISTIC OF EACH CALIBRATION MEMBER K | (38) $CA_0$ | (39) $CB_0$ |
|  | MACHINE DIFFERENCE VARIATION COEFFICIENT V | (40) $VK_{A3} = |KA_{A3} - KA_{A0}|$ | (41) $VKB_3 = |KB_{B3} - KB_{B0}|$ |
|  | COMPARISON AND DETERMINATION BETWEEN MACHINE DIFFERENCE VARITION COEFFICIENT AND THRESHOLD TV | (42) $VK_{A3} > TVA$ (EXCEEDING THESHOLD) | (43) $VK_{B3} > TVB$ (EXCEEDING THESHOLD) |
|  | COMPARISON AND DETERMINATION BETWEEN TOTAL VARIATION AMOUNT OF MACHINE DIFFERENCES FROM VALUE OF REFERENCE CALCULATION AND THRESHOLD TX | (44) $1-TX \leqq KA_{A0}/KA_{A3} \leqq 1+TX$ | (45) $1-TX \leqq KB_{B0}/KB_{B3} \leqq 1+TX$ |
|  | UPDATE OF CORRECTION COEFFICIENT A | (46) EXECUTED | (47) EXECUTED |
|  | CORRECTION COEFFICIENT X DURING SAMPLE IMAGE CORRECTION | (48) $XA_3 = S_{A0}/S_{A3} = S_{A0}/(KA_{A3} \times CA_0)$ | (49) $XB_3 = S_{A0}/S_{B3} = S_{A0}/(KB_{B3} \times CB_0)$ |

FIG. 7A

| | | DEVICE A | DVICE B | DEVICE C |
|---|---|---|---|---|
| DAY 2 | FREQUENCY CHARACTERISTIC OF REFERENCE SAMPLE S | (22) $S_{A2}$ | - | (23) $S_{C2}$ |
| | FREQUENCY CHARACTERISTIC OF CALIBRATION MEMBER K IN EACH DEVICE | (24) $KA_{A2}$ | (25) $KB_{B2}$ | (26) $KC_{C2}$ |
| | CORRELATION COEFFICIENT C BETWEEN FREQUENCY CHARACTERISTIC OF REFERENCE SAMPLE S AND FREQUENCY CHARACTERISTIC OF EACH CALIBRATION MEMBER K | (27) $CA_0$ | (28) $CB_0$ | (29) $CC_2 = S_{C2}/KC_{C2}$ |
| | MACHINE DIFFERENCE VARIATION COEFFICIENT V | (30) $VK_{A2} = KA_{A2}/KA_{A0}$ | (31) $VK_{B2} = KB_{B2}/KB_{B0}$ | - |
| | COMPARISON AND DETERMINATION BETWEEN MACHINE DIFFERENCE VARITION COEFFICIENT AND THRESHOLD TV | (32) $1-TVA \leq VK_{A2}$ $\leq 1+TVA$ | (33) $1-TVA > VK_{B2}$ OR $VK_{B2} > 1+TVA$ (OUTSIDE THRESHOLD RANGE) | - |
| | UPDATE OF CORRECTION COEFFICIENT A | (34) UNNECESSARY | (35) EXECUTED | - |
| | CORRECTION COEFFICIENT X DURING SAMPLE IMAGE CORRECTION | (36) $XA_0$ | (37) $XB_2 = S_{A0}/S_{B2} = S_{A0}/(KB_{B2} \times CB_0)$ | (38) $XC_2 = S_{A0}/S_{C2} = S_{A0}/(S_{C2} \times S_{A0}/S_{A2})$ OR $XC_2 = S_{A0}/S_{C2} = S_{A0}/(S_{C2} \times (1/VK_{A2}))$ |

FIG. 7B

| | | DEVICE A | DEVICE B | DEVICE C |
|---|---|---|---|---|
| DAY 3 | FREQUENCY CHARACTERISTIC OF CALIBRATION MEMBER K IN EACH DEVICE | (39) $KA_{A3}$ | (40) $KB_{B3}$ | (41) $KC_{C3}$ |
| | CORRELATION COEFFICIENT C BETWEEN FREQUENCY CHARACTERISTIC OF REFERENCE SAMPLE S AND FREQUENCY CHARACTERISTIC OF EACH CALIBRATION MEMBER K | (42) $CA_0$ | (43) $CB_0$ | (44) $CC_2$ |
| | MACHINE DIFFERENCE VARIATION COEFFICIENT V | (45) $VK_{A3}=KA_{A3}/KA_{A0}$ | (46) $VK_{B3}=KB_{B3}/KB_{B2}$ | (47) $VK_{C3}=KC_{C3}/KC_{C2}$ |
| | COMPARISON AND DETERMINATION BETWEEN MACHINE DIFFERENCE VARITION COEFFICIENT AND THRESHOLD TV | (48) $1-TVA > VK_{A3}$ OR $VK_{A3} > 1+TVA$ (OUTSIDE THRESHOLD RANGE) | (49) $1-TVB > VK_{B3}$ OR $VK_{B3} > 1+TVB$ (OUTSIDE THRESHOLD RANGE) | (50) $VK_{C3} \leq TC$ |
| | UPDATE OF CORRECTION COEFFICIENT A | (51) EXECUTED | (52) EXECUTED | (53) UNNECESSARY |
| | CORRECTION COEFFICIENT X DURING SAMPLE IMAGE CORRECTION | (54) $XA_3=S_{A0}/S_{A3}=S_{A0}/KA_{A3} \times CA_0$ | (55) $XB_3=S_{A0}/S_{B3}=S_{A0}/KB_{B3} \times CB_0$ | (56) $XC_0$ |

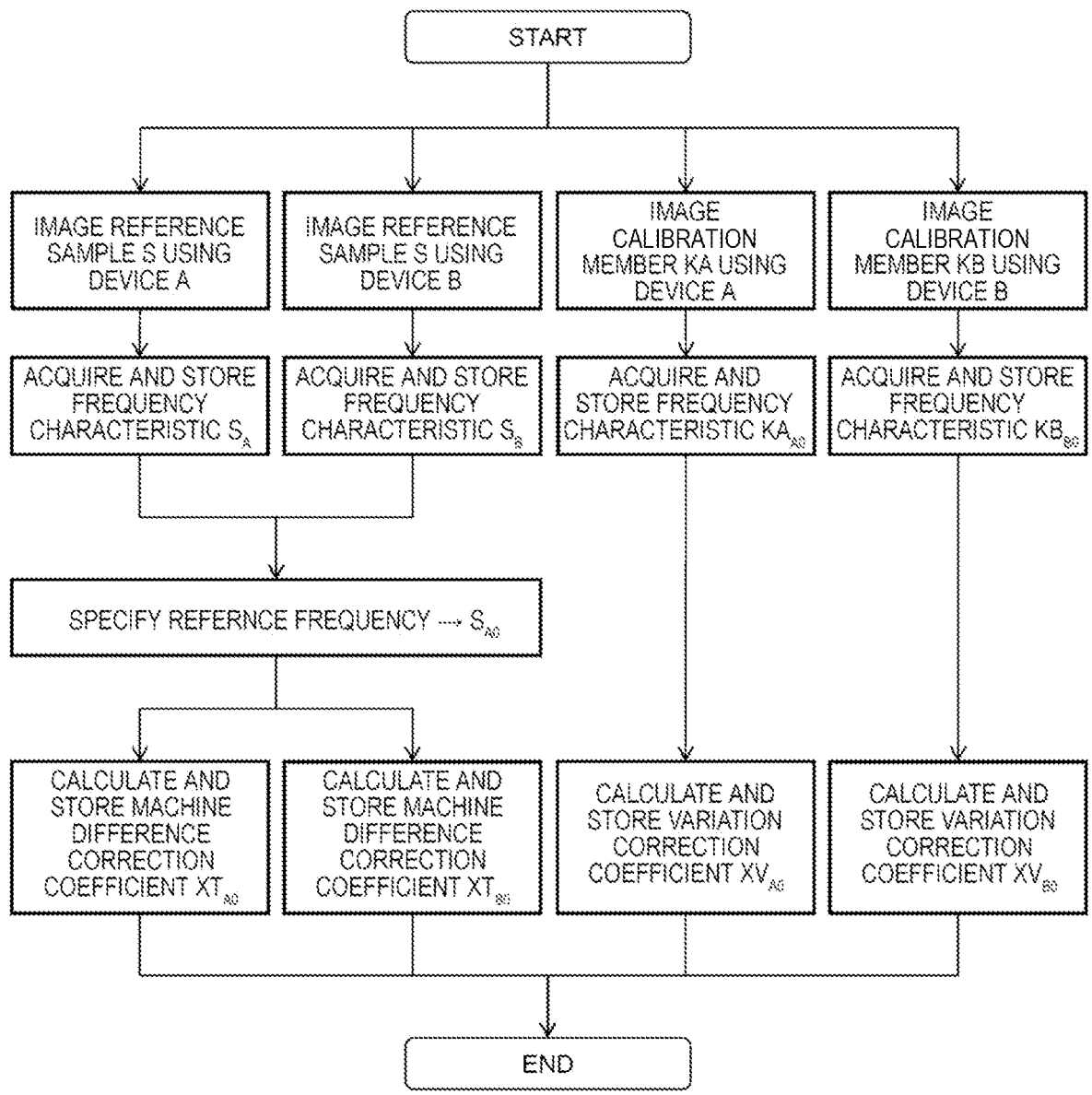

FIG. 9A

| | | DEVICE A | DEVICE B | DEVICE C |
|---|---|---|---|---|
| DAY 0 (MACHINE DIFFERENCE CALIBRATION DAY) | FREQUENCY CHARACTERISTIC OF REFERENCE SAMPLE S | (1) $S_{A0}$ | (2) $S_{B0}$ | - |
| | REFERENCE FREQUENCY CHARACTERISTIC FOR MACHINE DIFFERENCE CORRECTION | (3) $S_{A0}$ (REFERENCE) | | - |
| | FREQUENCY CHARACTERISTIC OF CALIBRATION MEMBER K | (4) $KA_{A0}$ | (5) $KB_{B0}$ | - |
| | REFERENCE FREQUENCY CHARACTERISTIC FOR VARIATION CORRECTION | (6) $KA_{A0}$ | (7) $KB_{B0}$ | - |
| | MACHINE DIFFERENCE CORRECTION COEFFICIENT XT | (8) $XTA_0 = S_{A0}/S_{A0}$ | (9) $XTB_0 = S_{A0}/S_{B0}$ | - |
| | VARIATION CORRECTION COEFFICIENT XV | (8) $XVA_0 = KA_{A0}/KA_{A0}$ | (8) $XVB_0 = KB_{B0}/KB_{B0}$ | |

FIG. 9B

| | | DEVICE A | DEVICE B | DEVICE C |
|---|---|---|---|---|
| DAY 1 | FREQUENCY CHARACTERISTIC OF CALIBRATION MEMBER K | (10) $KA_{A1}$ | (11) $KB_{B1}$ | - |
| | MACHINE DIFFERENCE VARIATION COEFFICIENT V | (14) $VK_{A1} = KA_{A1}/KA_{A0}$ | (15) $VK_{B1} = KB_{B1}/KB_{B0}$ | - |
| | COMPARISON AND DETERMINATION BETWEEN MACHINE DIFFERENCE VARIATION COEFFICIENT AND THRESHOLD TV | (16) $1 - TVA \leq VK_{A1} \leq 1 + TVA$ | (17) $1 - TVB \leq VK_{B1} \leq 1 + TB$ | - |
| | UPDATE OF VARIATION CORRECTION COEFFICIENT XV | (18) UNNECESSARY | (19) UNNECESSARY | - |
| | VARIATION CORRECTION COEFFICIENT XV | (20) $XVA_0$ | (21) $XVB_0$ | - |

FIG. 9C

| | | DEVICE A | DEVICE B | DEVICE C |
|---|---|---|---|---|
| DAY 2 | FREQUENCY CHARACTERISTIC OF REFERENCE SAMPLE S | (42) $S_{A2}$ | - | (43) $S_{C2}$ |
| | FREQUENCY CHARACTERISTIC OF CALIBRATION MEMBER K | (22) $KA_{A2}$ | (23) $KB_{B2}$ | (44) $KC_{C2}$ |
| | MACHINE DIFFERENCE VARIATION COEFFICIENT V | (26) $VK_{A2}=KA_{A2}/KA_{A0}$ | (27) $VK_{B2}=KB_{B2}/KB_{B0}$ | - |
| | COMPARISON AND DETERMINATION BETWEEN MACHINE DIFFERENCE VARIATION COEFFICIENT AND THRESHOLD TV | (28) $1-TVA \leq VK_{A2} \leq 1+TVA$ | (29) $1-TVB > VK_{B2}$ OR $VK_{B2} > 1+TVB$ (OUTSIDE THRESHOLD RANGE) | - |
| | UPDATE OF CORRECTION COEFFICIENT XV | (30) UNNECESSARY | (31) EXECUTED | - |
| | MACHINE DIFFERENCE CORRECTION COEFFICIENT XT | (8) $XTA_0$ | (9) $XTB_0$ | (46) $XTC_0=S_{A0}/S_{C0}=S_{A0}/\{S_{C2} \times S_{A0}/S_{A2}\}$ OR $XTC_0=S_{A0}/S_{C0}=S_{A0}/\{S_{C2} \times (1/VK_{A2})\}$ |
| | VARIATION CORRECTION COEFFICIENT XV | (32) $XVA_0$ | (8) $XVB_0=KB_{B0}/KB_{B2}$ | (8) $XVC_0=KC_{C2}/KC_{C2}$ |

FIG. 9D

| | | DEVICE A | DEVICE B | DEVICE C |
|---|---|---|---|---|
| DAY 3 | FREQUENCY CHARACTERISTIC OF CALIBRATION MEMBER K | (32) $KA_{A3}$ | (33) $KB_{B3}$ | (44) $KC_{C3}$ |
| | MACHINE DIFFERENCE VARIATION COEFFICIENT V | (34) $VK_{A3}=KA_{A3}/KA_{A0}$ | (35) $VK_{B3}=KB_{B3}/KB_{B2}$ | (35) $VK_{C3}=KC_{C3}/KC_{C2}$ |
| | COMPARISON AND DETERMINATION BETWEEN MACHINE DIFFERENCE VARIATION COEFFICIENT AND THRESHOLD TV | (40) $1-TVA > VK_{A3}$ OR $VK_{A3} > 1+TVA$ (OUTSIDE THRESHOLD RANGE) | (37) $1-TVB > VK_{B3}$ OR $VK_{B3} > 1+TVB$ (OUTSIDE THRESHOLD RANGE) | (37) $1-TVC \leq VKC_3 \leq 1+TVC$ |
| | UPDATE OF CORRECTION COEFFICIENT A | (42) EXECUTED | (39) EXECUTED | (39) UNNECESSARY |
| | VARIATION CORRECTION COEFFICIENT XV | (32) $XVA_0=KA_{A0}/KA_{A3}$ | (8) $XVB_0=KB_{B0}/KB_{B3}$ | (8) $XVC_0=KC_{C2}/KC_{C2}$ |

CORRECTION COEFFICIENT CALCULATION DEVICE, CORRECTION COEFFICIENT CALCULATION METHOD, AND CORRECTION COEFFICIENT CALCULATION PROGRAM

TECHNICAL FIELD

The present disclosure relates to a technique of calculating a machine difference correction coefficient for correcting a machine difference between image acquisition devices that acquire an image of a sample.

BACKGROUND ART

In a semiconductor manufacturing process, in order to manage the result of the dimension or shape of a pattern, diagnosis based on a feature amount is frequently used, the feature amount being extracted from a signal obtained by irradiating a semiconductor pattern with light or an electron beam. For example, a critical dimension-scanning electron microscope (CD-SEM) scans and irradiates a fine pattern formed on a semiconductor wafer with an electron beam, detects and images the emitted secondary electrons, and measures the pattern dimension based on a quantitative feature amount extracted from the image.

Among semiconductor inspection and measurement devices, in the CD-SEM that measures the dimension of a fine pattern such as a semiconductor from the acquired image, it is desirable that a difference (machine difference) in length measurement value between a plurality of devices is small. Until now, attempts to reduce the machine difference to an allowable range by adjustment in terms of software or hardware have been made. However, as the pattern such as a semiconductor is further miniaturized, an existing machine difference reduction method is about to reach its limit.

WO2019/021536A (PTL 1) describes a technique of correcting a machine difference between electron beam observation devices. PTL 1 discloses the technique, "an electron beam observation device including: an electron source; and an objective lens configured to focus an electron beam emitted from the electron source, in which an image is generated based on a secondary signal generated from a sample when the sample is irradiated with the electron beam. The electron beam observation device further includes a control unit configured to image a reference sample having a specific pattern multiple times to generate a plurality of images and configured to calculate a frequency characteristic for each of the plurality of images, in which the control unit stores the plurality of frequency characteristics" (refer to ABSTRACT).

JP2019-185962A (PTL 2) describes a technique of measuring an aperture angle of an electron beam that is one example of the image feature amount. PTL 2 discloses the object, "an object of the present disclosure is to propose a charged particle beam device capable of appropriately evaluating and setting an aperture angle of a beam", and proposes the technique, "As one aspect for achieving the above-described object, provided is a charged particle beam device which includes a plurality of lenses and controls the plurality of lenses such that the lenses are focused at a predetermined height on a sample and an aperture angle of a beam is adjusted. The charged particle beam device generates (S102) a first signal waveform based on a detection signal obtained by scanning the sample with the beam in a state where the lenses are focused at a first height that is a bottom portion of a pattern formed on the sample, calculates (S104) a feature amount of a signal waveform on a bottom edge of the pattern based on the first signal waveform, and calculates (S106) the aperture angle of the beam based on the calculated feature amount" (refer to ABSTRACT).

CITATION LIST

Patent Literature

PTL 1: WO2019/021536A
PTL 2: JP2019-185962A

SUMMARY OF INVENTION

Technical Problem

In the technique described in PTL 1, the same sample is observed using a plurality of devices, a frequency characteristic obtained from each image is corrected such that one frequency characteristic is equivalent to another frequency characteristic. As a result, the machine difference is corrected. However, actually, the machine difference varies daily due to a change in environment where a measurement device is placed, a deterioration over time of an internal component of a device, or the like. In order to continuously maintain the machine difference to be small, the method disclosed in PTL 1 needs to be executed frequently.

In the example of the related art disclosed in PTL 1, in order to exclude the influence of a difference between frequency characteristics derived from a sample, a correction coefficient needs to be obtained using a common sample for a plurality of devices. However, when the measurement is executed frequently, the sample needs to be carried around for each device to be corrected, which leads to a poor efficiency. In particular, on a semiconductor manufacturing line, a machine difference between several tens of measurement devices is required to be reduced to be as small as possible. Therefore, several days are expected to be required for all the devices to measure one sample. The machine difference varies daily. Therefore, the machine difference varies even while the correction coefficient is being obtained, and a decrease in the accuracy of correction is concerned.

The present disclosure has been made to solve the above-described problem, and an object thereof is to provide a technology for calculating a machine difference correction coefficient more efficiently with higher accuracy.

Solution to Problem

A defect inspection device according to the present disclosure calculates a machine difference correction coefficient for correcting a difference in the feature amount of a reference sample between devices, and when a machine difference variation coefficient indicating the change over time in the feature amount of a calibration member is outside a threshold range, recalculates the machine difference correction coefficient by using the feature amount of the calibration member.

Advantageous Effects of Invention

In a defect inspection device according to the present disclosure, a correction coefficient is obtained from a sample unique to devices. As a result, a period of time required to calculate the correction coefficient can be significantly reduced, and a machine difference correction coefficient can be obtained more efficiently with higher accuracy.

BRIEF DESCRIPTION OF DRAWINGS

FIG. 4A is a change over time table illustrating an operation example of the first embodiment.

FIG. 4B is a change over time table illustrating an operation example of the first embodiment.

FIG. 4C is a change over time table illustrating an operation example of the first embodiment.

FIG. 4D is a change over time table illustrating an operation example of the first embodiment.

FIG. 7A is a diagram illustrating a result of calculating each parameter when the device C is newly added on Day 2 of a second embodiment.

FIG. 7B is a diagram illustrating a calculation example on Day 3 of the second embodiment.

FIG. 8 is a flowchart illustrating a procedure of allowing a defect inspection device 1 according to the third embodiment to calculate a machine difference correction coefficient XT and a variation correction coefficient XV.

FIG. 9A is a change over time table illustrating an operation example of the third embodiment.

FIG. 9B is a change over time table illustrating an operation example of the third embodiment.

FIG. 9C is a change over time table illustrating an operation example of the third embodiment.

FIG. 9D is a change over time table illustrating an operation example of the third embodiment.

DESCRIPTION OF EMBODIMENTS

First Embodiment

Figure 1:
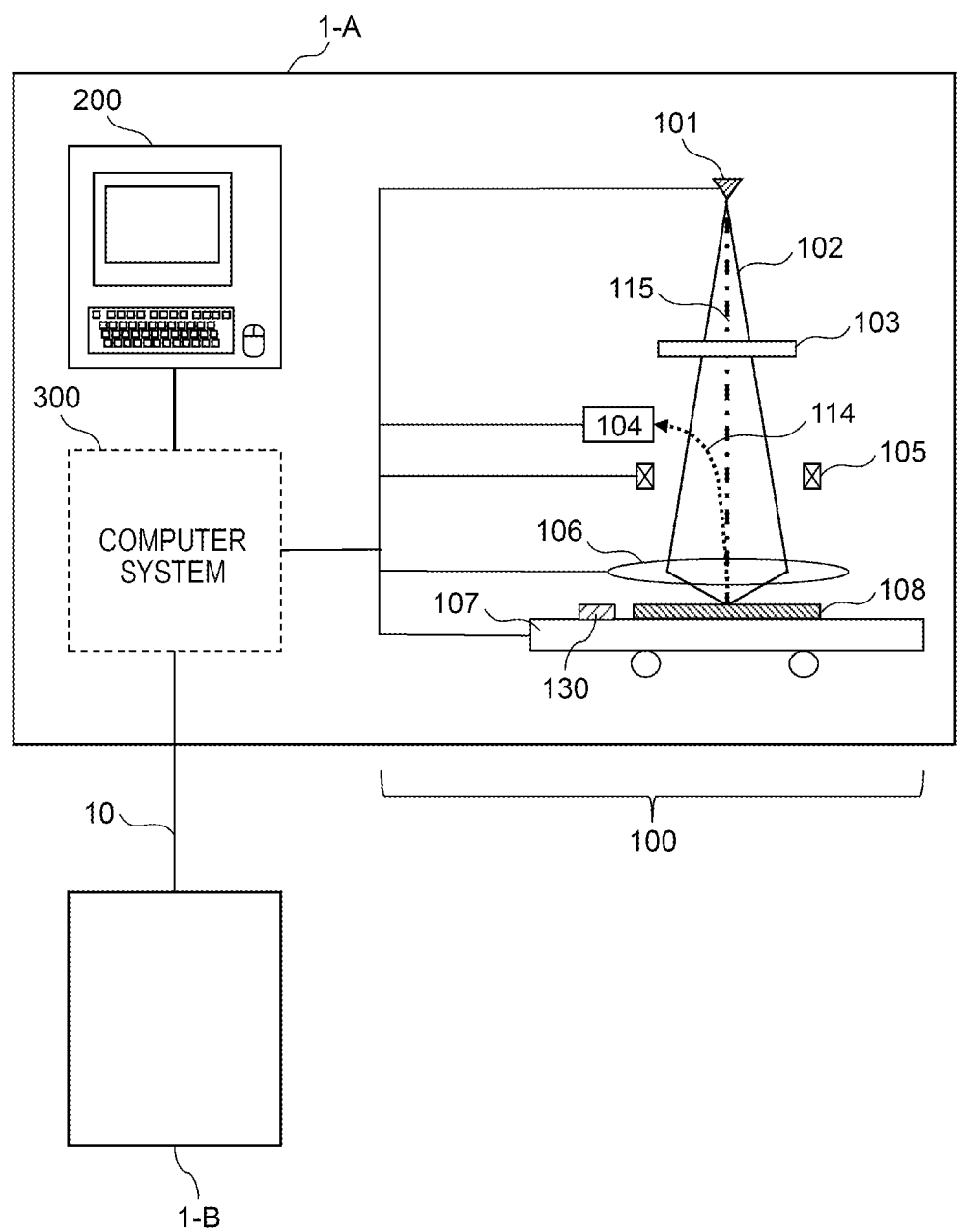
FIG. 1 is a block diagram illustrating a schematic configuration of a defect inspection device 1-A according to a first embodiment.

FIG. 1 is a block diagram illustrating a schematic configuration of a defect inspection device 1-A according to a first embodiment of the present disclosure. FIG. 1 illustrates an electron beam observation system connected to the defect inspection device 1-A and a defect inspection device 1-B through a communication means 10 such as a data bus or a network. The defect inspection device 1-A and the defect inspection device 1-B are configured to transmit and receive data to and from each other through the communication means 10. Since configurations of the defect inspection device 1-A and the defect inspection device 1-B are the same, only the defect inspection device 1-A will be described below. When the defect inspection device 1-A and the defect inspection device 1-B do not need to be distinguished from each other, the defect inspection device 1-A and the defect inspection device 1-B will be referred to as a defect inspection device 1.

A scanning electron microscope 100 is a device that observes a sample 108 by irradiating the sample 108 with an electron beam 102. A computer system 300 controls each unit in the scanning electron microscope 100. An operation unit 200 is a user interface used for transmitting an instruction to the scanning electron microscope 100 through the computer system 300. The computer system 300 may be a component of any of the electron beam observation devices or may be a device separate from the devices. In FIG. 1, the computer system 300 is disposed as a component of the device 1-A.

The electron beam 102 emitted from an electron gun 101 propagates along an optic axis 115, is deflected by a deflector 105 for scanning, and is converged by an objective lens 106, and then the sample 108 on a stage 107 is irradiated with the electron beam 102. Secondary electrons 114 emitted from the sample 108 are detected by a detector 104. The computer system 300 images a detection signal of the secondary electrons 114 output from the detector 104. A display on the operation unit 200 displays the image.

When the dimension of a pattern of the sample 108 is measured from the images acquired from the defect inspection devices 1-A and 1-B, it is desirable that a difference (machine difference) in length measurement value between the devices is small. However, even when the same pattern is measured, the length measurement value may vary depending on the electron beam observation device due to various causes.

PTL 1 proposes the image correction method in which a machine difference between devices A and B is suppressed by imaging the same sample in the device A and the device B in advance and correcting a difference between frequency characteristics extracted from the images. However, due to a deterioration over time of the devices, a variation in usage environment, or the like, there may be a small difference in the shape of an electron beam even between the devices where the machine difference is suppressed once. Therefore, the machine difference varies constantly.

In PTL 1, for example, when a large machine difference between the devices A and B is observed again, the same sample is imaged again in the device A and the device B, the correction coefficient for correcting a difference between frequency characteristics extracted from the images is updated, and the image of the sample acquired by each device is corrected. When a device group for which the machine difference is to be suppressed includes, for example several tens of devices instead of two devices, enormous effort and time are required to image the same sample in all of the devices and to calculate a machine difference correction coefficient, which is not realistic. On the other hand, when the device A and the device B use different samples, it is difficult to determine whether the obtained difference between frequency characteristics is derived from the device or the samples, and the machine difference correction coefficient cannot be appropriately obtained.

Therefore, in the first embodiment, separate from a reference sample, a calibration member 130 is mounted on the stage 107, a difference in frequency characteristic between the reference sample and the calibration member 130 is stored as a sample difference correction coefficient in advance, and each device acquires an image of the calibration member 130 during the correction coefficient calculation. After correcting the image using the sample difference correction coefficient, a machine difference correction coefficient is calculated. The calibration member 130 can be configured, for example, by cutting a part of a sample (for example, a semiconductor wafer) to be inspected and fixing the cut sample onto the stage 107.

Figure 2:
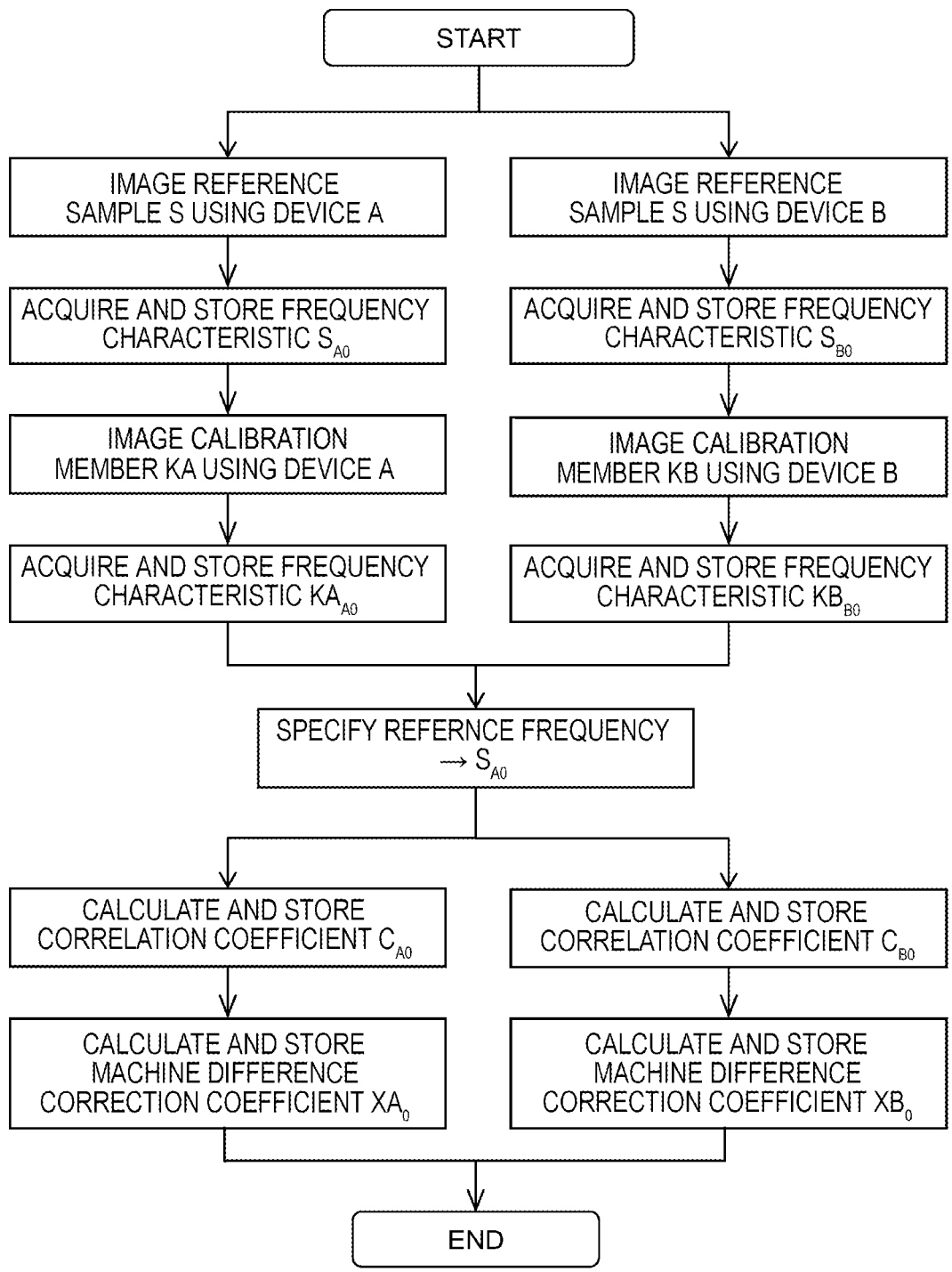
FIG. 2 is a flowchart illustrating a procedure of calculating a machine difference correction coefficient.

FIG. 2 is a flowchart illustrating a procedure of calculating the machine difference correction coefficient. This flowchart is implemented by the computer system 300 controlling each unit of the scanning electron microscope 100. Here, it is assumed that the machine difference between the defect inspection device 1-A (device A) and the defect inspection device 1-B (device B) is corrected. Hereinafter, each step in FIG. 2 will be described.

The device A captures an image of a reference sample S and acquires a frequency characteristic $S_{A0}$ of the image. The frequency characteristic described herein refers to a frequency spectrum characteristic of the image of the sample, for example, as described in PTL 1. The device A captures an image of a calibration member KA (described above as the calibration member 130) in the device A and acquires a frequency characteristic $KA_{A0}$ of the image. The device A calculates a correlation coefficient $CA_0$ using the frequency characteristic $S_{A0}$ (the calculation procedure is described below). The device A calculates and stores a machine difference correction coefficient $XA_0$ (the calculation procedure is described below). Likewise, the device B also acquires a frequency characteristic from each of images of the reference sample S and a calibration member KB, calculates a correlation coefficient $CB_0$, and calculates and stores a machine difference correction coefficient $XB_0$.

Figure 3:
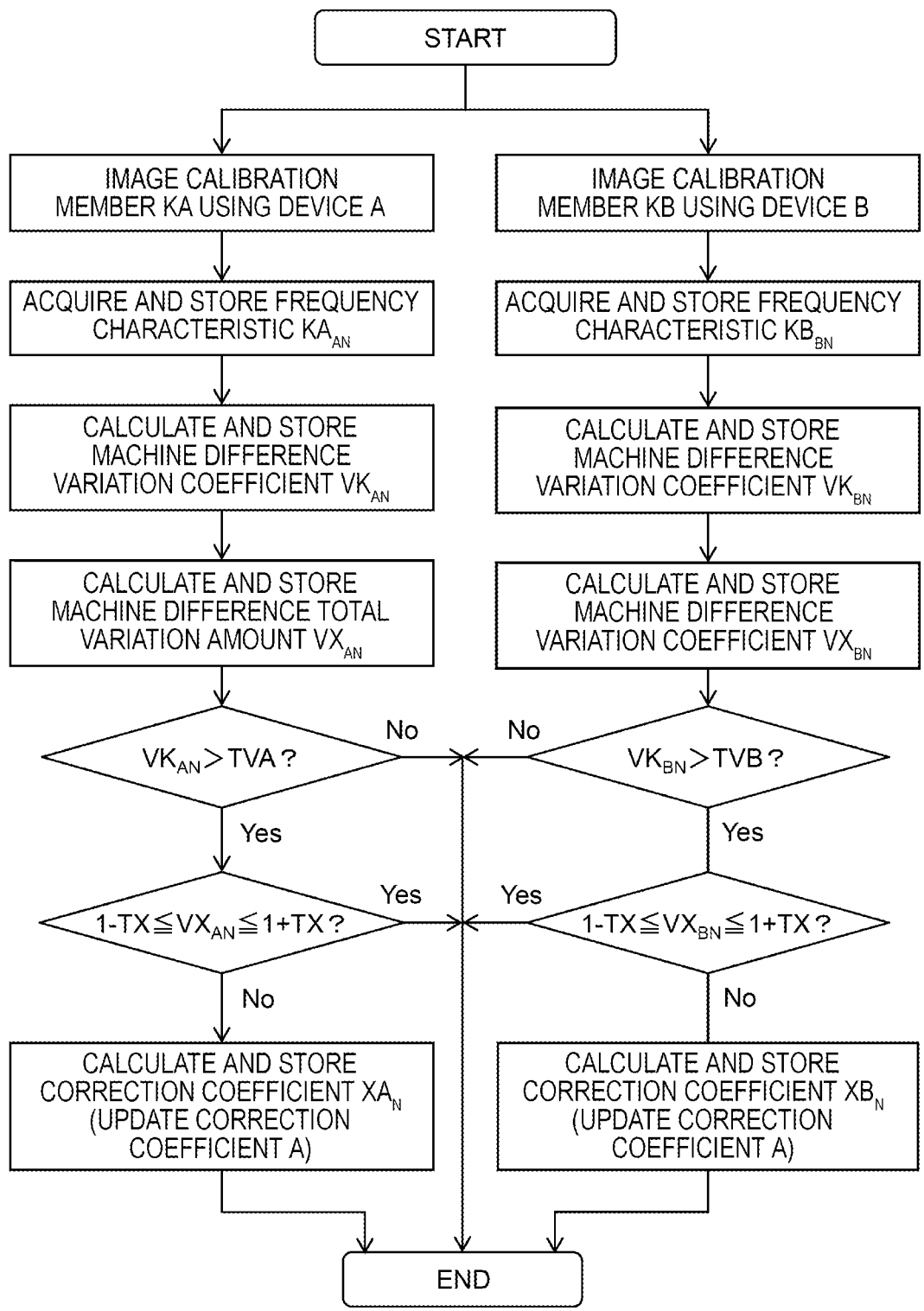
FIG. 3 is a flowchart illustrating recalculation of the machine difference correction coefficient when a change in device state occurs.

FIG. 3 is a flowchart illustrating recalculation of the machine difference correction coefficient when a change in device state occurs. When the device state changes, the correction amount is insufficient with the obtained machine difference correction coefficient. The computer system 300 determines whether the machine difference correction coefficient needs to be recalculated by executing this flowchart at predetermined time intervals (for example, once per day). Hereinafter, each step in FIG. 3 will be described. Since the device A and the device B execute the same process, only the operation of the device A will be described below.

N days after obtaining the machine difference correction coefficient $XA_0$, the device A images the calibration member KA again, obtains a frequency characteristic $KA_{AN}$, and calculates and stores a machine difference variation coefficient $VK_{AN}$ based on a difference between the frequency characteristic $KA_{AN}$ and KA used for the previous machine difference correction coefficient calculation. The machine difference variation coefficient $VK_{AN}$ is a coefficient for sequentially monitoring a change over time in the feature amount of the calibration member. The calculation example will be described below.

In order to prevent a malfunction caused by over-correction, the device A calculates and stores a machine difference total variation coefficient $VX_{AN}$ based on a difference between KA used for the reference frequency characteristic acquisition, that is, $KA_{A0}$ and $KA_{AN}$. The machine difference total variation coefficient $VX_{AN}$ represents the amount of variation of the feature amount of the calibration member KA from the amount during the initial calculation. The calculation example will be described below.

The device A determines whether $VK_{AN}$ is within a range of a threshold TVA, and further determines whether $VX_{AN}$ is within a range of an upper limit threshold (1+TX) and a lower limit threshold (1−TX). When both $VK_{AN}$ and $VX_{AN}$ do not satisfy the threshold ranges, the device A calculates and stores a new machine difference correction coefficient $XA_{AN}$ using the correction coefficient $KA_{AN}$. Alternatively, when any one of $VK_{AN}$ or $VX_{AN}$ does not satisfy the threshold range, the device A may update the machine difference correction coefficient $XA_{AN}$. In the calculation example described below, for easy understanding, it is assumed that, when any one of $VK_{AN}$ or $VX_{AN}$ does not satisfy the threshold range, the device A updates the machine difference correction coefficient $XA_{AN}$.

FIGS. 4A to 4D are change over time tables illustrating operation examples of the first embodiment. For convenience of description, each drawing illustrates a change over time of each parameter per day.

On Day 0, the device A acquires the frequency characteristic $S_{A0}$ of the reference sample S, and sets the frequency characteristic Sao as a reference frequency characteristic between the devices A and B. The device A acquires the frequency characteristic $KA_{A0}$ of the calibration member KA and obtains the correlation coefficient $C_{A0}$ between the reference sample S and the calibration member K by calculating $S_{A0}$ and $KA_{A0}$. The correlation coefficient $C_{A0}$ is a coefficient used for convenience to calculate the machine difference correction coefficient $XA_0$. The device A obtains the machine difference correction coefficient XA by calculating $S_{A0}$, $KA_{A0}$, and $C_{A0}$. The machine difference correction coefficient is a coefficient for correcting the difference in feature amount between the devices A and B. Since the device A is set as the reference, the machine difference correction coefficient $XA_0$ on Day 0 is 1.

On Day 0, the device B also calculates the same coefficient. Note that, since the device A is set as the reference, a machine difference correction coefficient $XB_0$ is a coefficient representing a difference between $S_{A0}$ and $S_{B0}$. In this example, a ratio between $S_{A0}$ and $S_{B0}$ is the machine difference correction coefficient $XB_0$ (Expression (9)). By substituting $S_{B0}$ derived from Expression (7) into the second arithmetic expression of Expression (9), the third arithmetic expression of Expression (9) can be obtained.

On Day 1, the device A obtains a frequency characteristic $KA_{A1}$ using the calibration member KA. The device A obtains a machine difference variation coefficient $VK_{A1}$ representing an absolute value of a difference between $KA_{A0}$ and $KA_{A1}$. Here, it is assumed that $VK_{A1}$ is within the threshold range. The machine difference total variation coefficient $VX_{AN}$ on Day 1 may be removed. In this example, the machine difference total variation coefficient $VX_{AN}$ is removed. The same can also be applied to the device B.

On Day 2, since a machine difference variation coefficient $VK_{B2}$ of the device B exceeds a threshold TVB, the device B updates a machine difference correction coefficient $XB_2$. Specifically, (a) a feature amount $S_{A0}$ of the reference sample S that is initially acquired by the device A is acquired, (b) a feature amount $KB_{B2}$ of the calibration member KB is newly acquired, and (c) XB is updated based on Expression (35). The same can also be applied to Day 3.

On Day 3, since a machine difference variation coefficient $VK_{A3}$ of the device A also exceeds the threshold TVA, the device A updates a machine difference correction coefficient $XA_3$. Specifically, (a) the feature amount $S_{A0}$ of the reference sample S that is initially acquired by the device A is acquired, (b) a feature amount $KA_{A3}$ of the calibration member KA is newly acquired, and (c) XA is updated based on Expression (48).

<First Embodiment: Summary>

In the first embodiment, in a case where the device A is set as the reference, when the machine difference variation coefficient $VK_{B2}$ of the device B exceeds the threshold TVB, the computer system 300 newly acquires the feature amount $KB_{B2}$ of the calibration member KB, and updates the machine difference correction coefficient $XB_2$ using the newly acquired feature amount $KB_{B2}$. The machine difference variation coefficient $VK_{B2}$ represents, for example, an change over time per day of the feature amount $KB_{B2}$ of the calibration member KB. Accordingly, even when the machine difference varies continuously, the machine difference correction coefficient can be appropriately updated according to the variation.

In the first embodiment, the computer system 300 calculates the machine difference total variation coefficient VX representing the amount of variation of the feature amount of the calibration member from the amount during the initial calculation, and when VX is not within a range of a threshold TX ($1-TX \leq VX \leq 1+TX$), the machine difference correction coefficient X is updated. As a result, by monitoring a change over time per day, a change over time that cannot be detected can be identified, and the machine difference correction coefficient can be appropriately updated according to the variation.

In the first embodiment, when the device A is set as the reference, after the feature amount $S_{A0}$ of the reference sample S is initially acquired, the computer system 300 updates the machine difference correction coefficient XB of the device B using the feature amount $S_{A0}$. Accordingly, in order to update the machine difference correction coefficient XB, the feature amount of the reference sample S does not need to be acquired again. As a result, after the feature amount $S_{A0}$ is initially acquired, the machine difference correction coefficient XB can be updated using only the feature amount in the device B. That is, the device B can complete the machine difference correction only in the device B without obtaining new information from the device A.

Second Embodiment

When a new defect inspection device 1-C (device C) is newly joined to the first embodiment, a machine difference correction coefficient corresponding to a calibration member KC in the device C needs to be obtained. In a second embodiment of the present disclosure, the procedure will be described.

The surface state of a semiconductor pattern changes depending on the number of years elapsed after manufacturing, an irradiation history of an electron beam, and repeated entry and exit to and from a sample chamber of an observation device. Accordingly, when, for example, several years elapse from the generation of the machine difference correction coefficients of the device A and the device B, there may be a concern of a difference from a newly generated machine difference correction coefficient XC of the device C due to a change over time of the reference sample. On the other hand, the calibration member mounted in the sample chamber in the device is held in a vacuum. Therefore, a change in frequency characteristic is smaller than that in the reference sample.

Therefore, in the second embodiment, when the new device C is added halfway, it is presumed that the feature amount of the reference sample S acquired by the device C is corrected based on the feature amount of the calibration member KA acquired by the device A such that the machine difference correction coefficient in the device C can be calculated.

Figure 5:
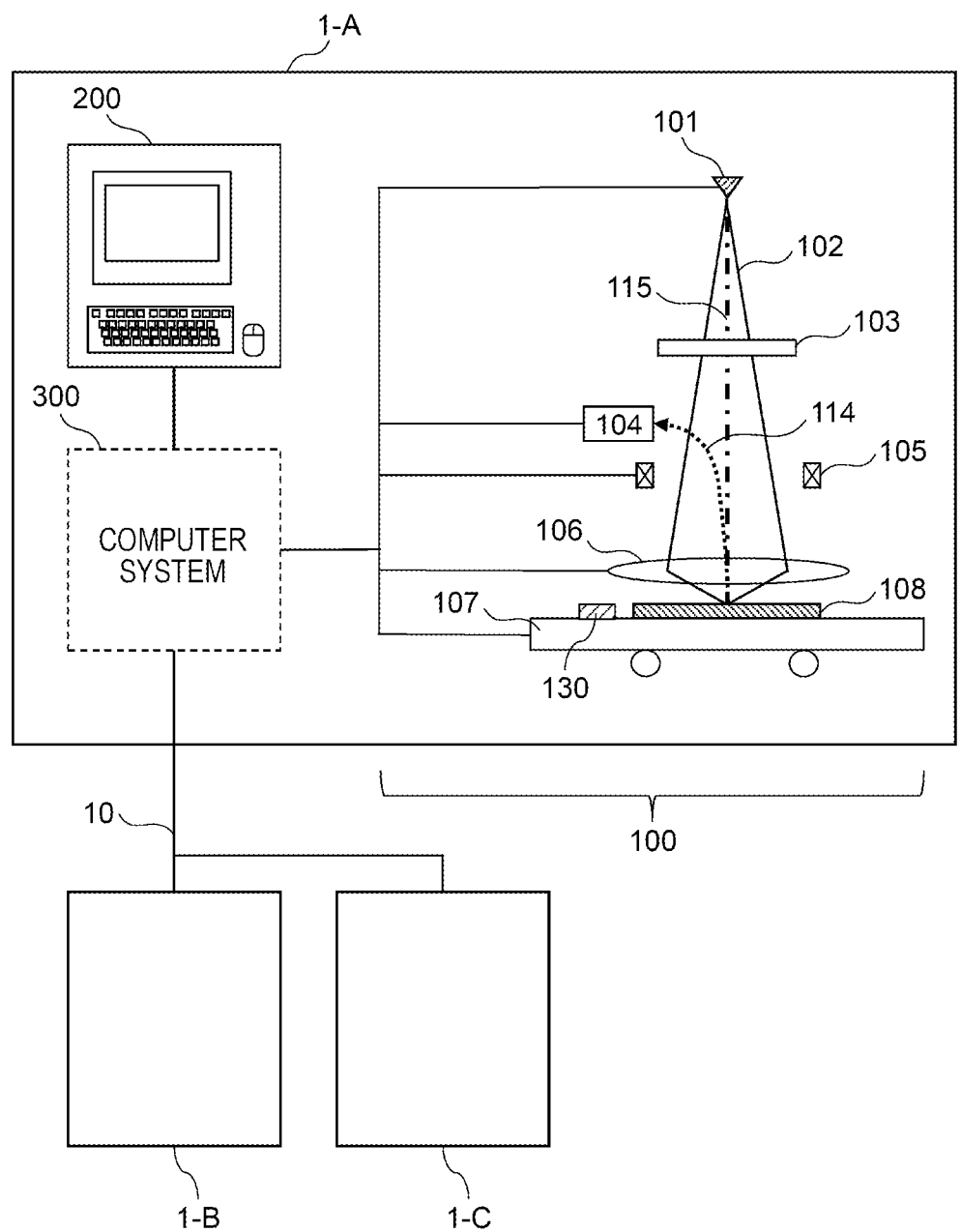
FIG. 5 is a diagram illustrating a state where a defect inspection device 1-C is newly added in a third embodiment.

FIG. 5 is a diagram illustrating a state where the defect inspection device 1-C is newly added in a third embodiment. The defect inspection device 1-C is connected to the computer system 300.

Figure 6:
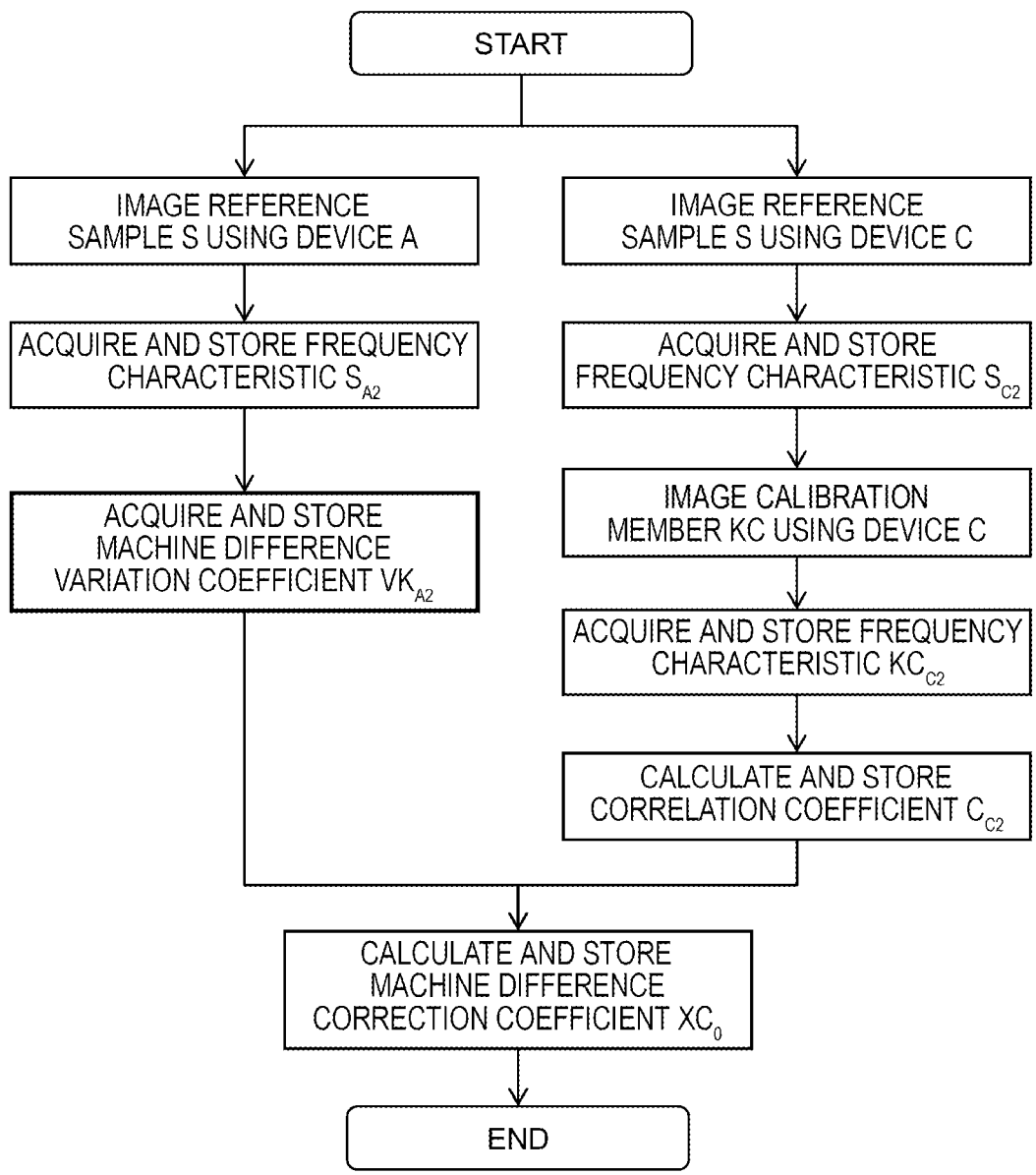
FIG. 6 is a flowchart illustrating a procedure of allowing a computer system 300 to calculate a machine difference correction coefficient XC of a device C.

FIG. 6 is a flowchart illustrating a procedure of allowing the computer system 300 to calculate the machine difference correction coefficient XC of the device C. The computer system 300 of the devices A and C executes this flowchart when the device C is newly added. Here, the procedure of a case where the device C is added on Day 2 according to the calculation example illustrated in FIG. 7 is illustrated. Hereinafter, each step in FIG. 7 will be described.

After the device C is added, a machine difference variation coefficient $VK_{A2}$ of the device A is obtained from the initial frequency characteristic $KA_{A0}$ of the calibration member KA of the device A and a current (Day 2) frequency characteristic $KA_{A2}$. The device C calculates a feature amount $S_{C2}$ of the reference sample S, a feature amount $KC_{C2}$ of the calibration member KC, and a correlation coefficient $C_{C2}$ at the time of the addition (Day 2).

Originally, a machine difference correction coefficient $XC_0$ of the device C needs to be calculated based on a difference between $S_{C0}$ and $S_{A0}$. However, since the device C is added from Day 2, $S_{C0}$ is not present. Accordingly, by converting $S_{C2}$ into a value corresponding to Day 0 using the feature amount in the device A, SC0 is reproduced in a pseudo manner. As a result, even for the device C that is added halfway, the machine difference correction coefficient $XC_0$ can be appropriately calculated. The calculation example will be described below.

FIG. 7A is a diagram illustrating a result of calculating each parameter when the device C is newly added on Day 2. The results on Day 0 to Day 1 are the same as those of the first embodiment, and thus are not illustrated. The device C calculates the machine difference correction coefficient $XC_0$ based on the difference between $S_{C0}$ and $S_{A0}$ (Expression (38)). Note that, since $S_{C0}$ is not present, $S_{C2}$ is converted into $S_{C0}$ according to the following procedure.

The frequency characteristic of the reference sample S changes over time. Therefore, not only a device difference (difference between the calibration members KA and KC) but also a sample difference (difference between the feature amount of the reference sample S acquired by the device A and the feature amount of the reference sample S acquired by the device C) are generated between $S_{A0}$ acquired by the device A on Day 0 and $S_{C2}$ acquired by the device C on Day 2. In order to convert $S_{C2}$ into $S_{C0}$, the two differences need to be corrected.

Between $S_{C2}$ and $S_{C0}$, there is a difference generated due to a change over time of the reference sample S for two days. It can be presumed that a ratio between $S_{C2}$ and $S_{C0}$ generated by the change over time has a characteristic similar to that of a ratio between $S_{A2}$ and $S_{A0}$ generated by the same change over time. Accordingly, it is presumed that $S_{C2}:S_{C0}=S_{A2}:S_{A0}$ or a relationship similar thereto is satisfied. $S_{C0}=S_{C2} \times S_{A0}/S_{A2}$ can be derived from this relationship. In principle, the first expression of Expression (38) is based on this point of view. Note that the following features may be further taken into consideration.

Between $S_{A2}$ and $S_{A0}$, there is a difference generated due to a change over time of the device A itself and a difference generated due to a change over time of the reference sample S itself. It is presumed that these differences are also shown in the change over time in the feature amount of the calibration member KA. Note that, since the calibration member KA is installed in a vacuum chamber, the change over time of the calibration member KA itself can be ignored. As a result, it can be assumed that the change over time in the feature amount of the calibration member KA actually includes only a portion derived from the change over time between $S_{A2}$ and $S_{A0}$. The machine difference variation coefficient $VK_{A2}$ can be defined as the ratios instead of the difference between $KA_{A2}$ and $KA_{A0}$. Therefore, in this case, $VK_{A2}$ can be considered to be equivalent to the ratio between $SA_{A2}$ and $SA_{A0}$. As a result, $VK_{A2}$ can be replaced with $VK_{A2}=KA_{A2}/KA_{A0}\approx SA_{A2}/SA_{A0}$. Accordingly, the first expression of Expression (38) may be rewritten into the second expression.

FIG. 7B illustrates a calculation example on Day 3 of the second embodiment. When the machine difference variation coefficient VK is outside the threshold range, the machine difference correction coefficient X is updated. Even for the machine difference total variation coefficient, the threshold may be determined as in the first embodiment. For convenience of description, the machine difference total variation coefficient is not illustrated in FIGS. 7A and 7B.

<Second Embodiment: Summary>

When $S_{C2}$ is initially calculated two days after the device A initially calculates $S_{A0}$, the defect inspection device 1 (device C) according to the second embodiment calculates the machine difference correction coefficient $XC_0$ using $S_{A0}$ that is initially calculated by the device A. As a result, even when a defect inspection device is added halfway to the defect inspection device group, it is not necessary to change the rule that each device calculates the machine difference correction coefficient with $S_{A0}$ as the reference. Therefore, a new defect inspection device can be added at any time without affecting measured values acquired by the existing device group.

When $S_{C2}$ is initially calculated two days after the device A initially calculates $S_{A0}$, the defect inspection device 1 (device C) according to the second embodiment calculates the machine difference correction coefficient $XC_0$ using not only $S_{A0}$ but also (a) $S_{C2}$ that is initially calculated by the device C and (b) $S_{A2}$ that is calculated by the device A when the device C initially calculates $S_{C2}$. As a result, assuming that the device C is added to the device group from the beginning on Day 0, $S_{C0}$ can be virtually derived. Accordingly, even when the device C is added halfway, the machine difference correction coefficient $XC_0$ can be calculated based on the same rule as the device group that is already added.

When $S_{C2}$ is initially calculated two days after the device A initially calculates $S_{A0}$, the defect inspection device 1 (device C) according to the second embodiment may calculate the machine difference correction coefficient $XC_0$ using not only $S_{A0}$ but also the machine difference variation coefficient $VK_{A2}$ of the device A. As a result, even when the device C is added halfway, the machine difference correction coefficient $XC_0$ can be calculated based on the same rule as the device group that is already added.

Third Embodiment

In the first and second embodiments, the frequency characteristic in the initial state of the reference device acquired using the reference sample is used as the reference of the machine difference correction coefficient. Accordingly, the machine difference correction coefficient X can be calculated by converting the frequency characteristic acquired by the calibration member into the frequency characteristic of the reference sample. In the third embodiment of the present disclosure, an example where the machine difference correction coefficient X is divided into (a) the machine difference correction coefficient XT for correcting the device difference and (b) the variation correction coefficient XV for correcting the variation over time in the same device. Any of the coefficients can be considered as a part of the machine difference correction coefficient X.

FIG. 8 is a flowchart illustrating a procedure of allowing the defect inspection device 1 according to the third embodiment to calculate the machine difference correction coefficient XT and the variation correction coefficient XV. The devices A and B can calculate machine difference correction coefficients $XT_{A0}$ and $XT_{B0}$ with the frequency characteristic $SA_{A0}$ as the reference. The machine difference correction coefficient XT represents only the change over time in the frequency characteristic of the reference sample S (does not include the frequency characteristic of the calibration member K). After the machine difference correction coefficient XT is initially calculated, the machine difference correction coefficient XT is stored as it is without being updated. The calculation example will be described below.

The device A calculates a frequency characteristic $KA_A$ of the calibration member KA. The device A calculates a variation correction coefficient $XV_A$, for example, per day. The variation correction coefficient $XV_A$ represents a change over time in $KA_A$. Likewise, the device B calculates a frequency characteristic $KB_B$ and a variation correction coefficient $XV_B$ of the calibration member KB. When the machine difference variation coefficient VK (the variation over time in the feature amount of the calibration member) is outside the threshold range, the variation correction coefficient XV is updated. The calculation example will be described below. Further, the machine difference total variation coefficient VX may be calculated as in the first embodiment.

When the sample image is corrected, (a) the machine difference on Day 0 is corrected using XT, and (b) the machine difference on days after Day 1 is corrected using XV based on the correction result using XT.

FIGS. 9A to 9D are change over time tables illustrating operation examples of the third embodiment. For convenience of description, each drawing illustrates a change over time of each parameter per day.

On Day 0, each of the devices A and B calculates a ratio of the feature amount of the reference sample S to SA0 and the machine difference correction coefficient XT. The machine difference correction coefficient $XT_{A0}$ of the device A is 1. The device A further calculates a variation correction coefficient $XV_{A0}$ representing a variation over time in the feature amount $KA_{A0}$ of the calibration member KA. The device B also calculates $XV_{B0}$ using in the same manner.

On Day 1, the machine difference variation coefficient $VK_{A1}$ of the device A is within the threshold. Therefore, the variation correction coefficient $XV_{A0}$ does not need to be updated. The same can also be applied to the device B.

On Day 2, the device C is newly added to the device group. The machine difference correction coefficient XT of the device C is calculated as in the second embodiment (Expression (46) is the same as Expression (38) of FIG. 7A). The variation correction coefficient of the device C is 1 because the frequency characteristic $KC_{C2}$ on Day 2 is set as the reference. On day 2, the machine difference variation coefficient $VK_{B2}$ of the device B is outside the threshold range. Therefore, a variation correction coefficient $XV_{B0}$ is updated based on a ratio between $KB_{B2}$ and $KB_{B0}$.

On Day 3, the machine difference variation coefficients VK of both the devices A and B are outside the threshold ranges. Therefore, a variation correction coefficient $XV_0$ is updated with a frequency characteristic $KB_3$ on Day 3 as the reference.

Third Embodiment: Summary

The defect inspection device 1 according to the third embodiment calculates the variation correction coefficient XV representing the change over time in the frequency characteristic of the calibration member K as a part of the machine difference correction coefficient X, and corrects the machine difference between the devices using the machine difference correction coefficient XT. After the machine difference correction coefficient XT is initially calculated, when the machine difference variation coefficient VK is outside the threshold range, the variation correction coefficient XV is updated, and when the machine difference variation coefficient VK is within the threshold range, the variation correction coefficient XV is not updated. That is, the machine difference correction coefficient X is divided into the machine difference correction coefficient XT and the variation correction coefficient XV, the correction between the devices is performed intensively using the machine difference correction coefficient XT only for the first time, and subsequently the machine difference variation coefficient VK is updated only in each device (without acquiring the coefficient of another device). As a result, after the first day, the difference in frequency characteristic between the reference sample S and the calibration member K does not need to be considered. Therefore, the calculation process of the coefficient is easier than that of the first and second embodiments.

Fourth Embodiment

In the first to third embodiments, the examples where the frequency characteristic is used as the feature amount extracted from the image are described. In a fourth embodiment of the present disclosure, an example where a feature amount extracted from the image is an aperture angle of an electron beam will be described.

PTL 2 describes the method of reducing a machine difference in the aperture angle of an electron beam in the electron microscope device. PTL 2 discloses the method of reducing a machine difference between devices by imaging samples having a plurality of different taper angles, extracting a feature amount from the obtained signal profile, feedbacking the obtained measurement result to the lens control of the device, and adjusting the aperture angle. However, actually, there is a variation between samples for measurement, and even when each device obtains an aperture angle from each sample for calibration, the machine difference cannot be appropriately estimated. A method in which all the devices measure one reference sample may be considered. However, this method is not realistic when the number of target devices is large or when it is desired to monitor the aperture angle at all times.

Accordingly, in the fourth embodiment, assuming that the aperture angle is measured using the calibration member in each device, both the reference sample and the calibration member are measured in advance, a coefficient (calibration member correction coefficient) for correcting the aperture angle obtained from the calibration member is applied. As a result, the aperture angles of the devices can be compared to each other.

Figure 10:
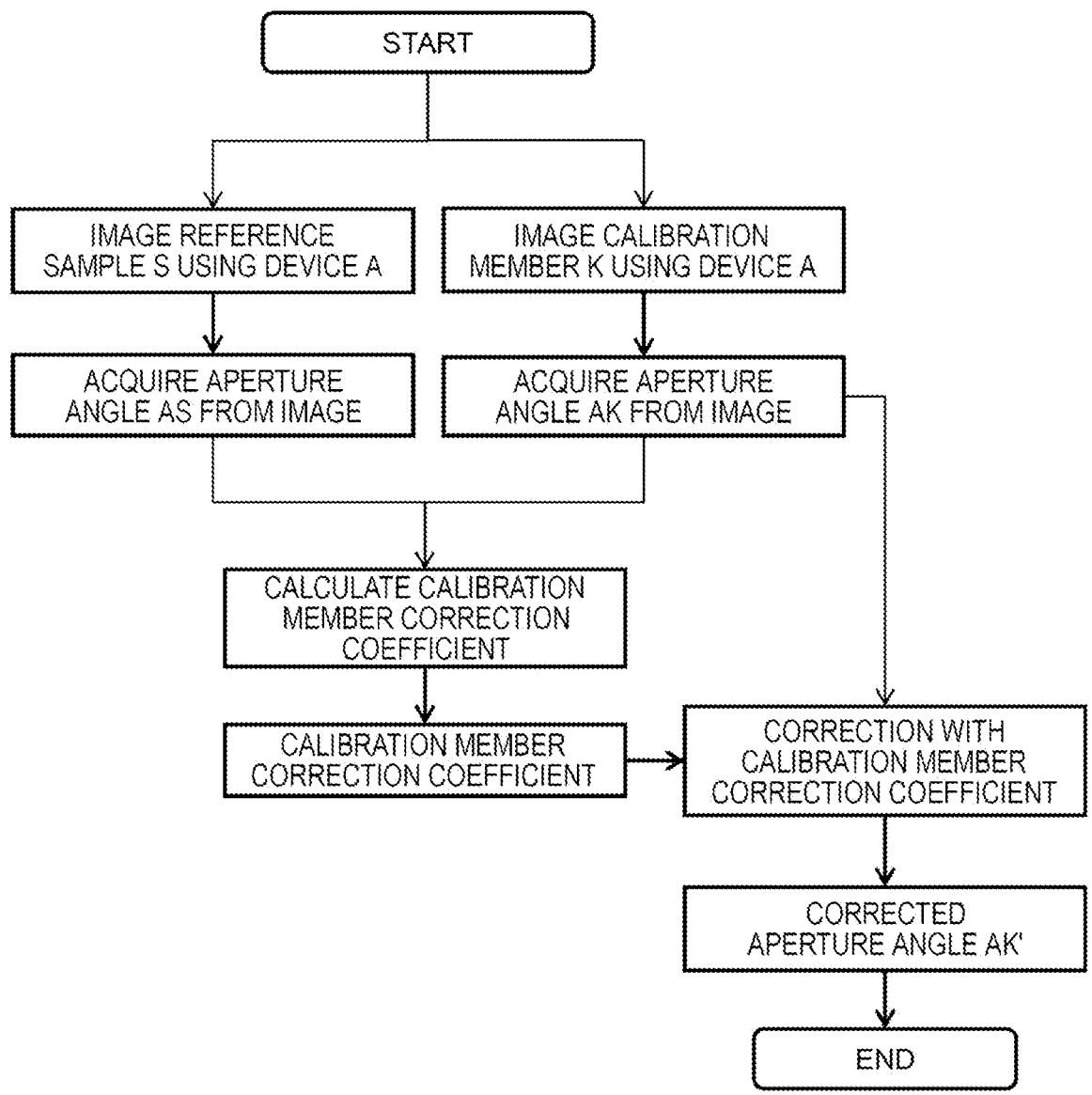
FIG. 10 is a flowchart illustrating a procedure of allowing a defect inspection device 1 according to a fourth embodiment to correct an aperture angle.

FIG. 10 is a flowchart illustrating a procedure of allowing the defect inspection device 1 according to the fourth embodiment to correct the aperture angle. This flowchart is executed by the computer system 300. Here, a case where the device A executes this flowchart is assumed. Hereinafter, each step in FIG. 10 will be described.

The device A acquires an image of the reference sample S and acquires an aperture angle AS from the image. The device A further acquires an image of the calibration member K and acquires an aperture angle AK from the image. The device A calculates a calibration member correction coefficient for correcting the aperture angle AK based on a difference between the aperture angle AS and the aperture angle AK. The device A acquires a corrected aperture angle AK' by correcting the aperture angle AK using the calibration member correction coefficient. Accordingly, the aperture angle AK' is an aperture angle acquired from the calibration member K and is also equivalent to the aperture angle AS.

Each device acquires the corrected aperture angle (BK' in the device B) based on the flowchart of FIG. 10. As a result, the machine difference in aperture angle between the devices can be obtained. When the image acquired from each device is corrected based on the machine difference in aperture angle, each device can reduce the machine difference without using the reference sample. Alternatively, when the machine difference in aperture angle can be fed back to the lens control of the device, the machine difference in aperture angle can be reduced by hardware.

Since the corrected aperture angle is used for correcting the image of each of the devices by comparing the corrected aperture angles between the devices, the corrected aperture angle has the same function as the frequency characteristic ($S_{A0}$ and $S_{B0}$ in FIG. 4A) of the reference sample S according to the first embodiment. Accordingly, the subsequent processes after the calculation of the corrected aperture angle are the same as those of the first embodiment.

In the fourth embodiment, the aperture angle is used as the feature amount of the image. However, other feature amounts can be used based on the flowchart of FIG. 10. For example, a beam spot diameter or a beam tilt angle that is an index value of an electron beam profile can be used as the image feature amount.

<Fourth Embodiment: Summary>

The defect inspection device 1 according to the fourth embodiment corrects the aperture angle AK with the aperture angle AS as the reference by calculating the calibration member correction coefficient using the aperture angle AS and the aperture angle AK. As a result, the aperture angle AK acquired from the calibration member K can be converted into a value that is equivalent to the aperture angle AS acquired from the reference sample S.

The defect inspection device 1 (device A) according to the fourth embodiment calculates a machine difference correction coefficient XA based on a difference between the corrected aperture angle AK' and a corrected aperture angle BK' acquired by the device B. As a result, as in the first embodiment, the machine difference between the devices can be corrected with the feature amount (SA when the device A is the reference device) of the reference sample S in the reference device as the reference. Further, by comparing the corrected aperture angles to each other, the machine difference can be corrected without acquiring the reference feature amount.

Regarding Modification Example of Present Disclosure

The present disclosure is not limited to the embodiments and includes various modification examples. For example, the embodiments have been described in detail in order to easily describe the present disclosure, and the present invention is not necessary to include all the configurations described above. In addition, a part of the configuration of one embodiment can be replaced with the configuration of another embodiment. Further, the configuration of one embodiment can be added to the configuration of another embodiment. In addition, addition, deletion, and replacement of another configuration can be made for a part of the configuration of each embodiment.

In the description of the above-described embodiments, the computer system 300 is configured as the correction coefficient calculation device (or the component of the correction coefficient calculation device) that calculates the machine difference correction coefficient of each electron beam observation device. The process to be executed by the computer system 300 can also be configured by hardware such as a circuit device that implements the process or can also be configured by an arithmetic device executing software that implements the process.

In the above-described embodiments, the coefficient such as the machine difference variation coefficient VK is described as the coefficient representing a variation over time in feature amount. The coefficient can be represented by an absolute value of a difference from a reference value, or can be represented by a ratio between the reference value and the current value. This is because these factors have the same meaning in essence. Note that, when VK needs to be represented by the ratio as in Expression (38) of FIG. 7A, the ratio is used. In this case, when the machine difference variation coefficient and the threshold are compared, it needs to be assumed that the machine difference variation coefficient is a ratio. Therefore, the threshold is determined as in Expressions (32) and (33) of FIG. 7A.

In the above-described embodiments, the scanning electron microscope is used as an example of the electron beam observation device. However, the present disclosure is also applicable to an electron beam observation device other than a scanning electron microscope or to a measurement device based on an image other than an electron microscope.

REFERENCE SIGNS LIST

1: defect inspection device
100: scanning electron microscope
200: operation unit
300: computer system

The invention claimed is:

1. A correction coefficient calculation device for calculating a machine difference correction coefficient for correcting a machine difference between image acquisition devices that acquire an image of a sample, the device comprising:
a computer system configured to calculate a machine difference correction coefficient for correcting a difference between first image data of the sample acquired by a first image acquisition device and second image data of the sample acquired by a second image acquisition device, wherein
the computer system acquires a first feature amount of image data of a reference sample that is acquired by the first image acquisition device,
the computer system acquires a second feature amount of the image data of the reference sample that is acquired by the second image acquisition device,
the computer system acquires a third feature amount of image data of a calibration member that is acquired by the first image acquisition device,
the computer system calculates the machine difference correction coefficient by calculating a correction value derived from a difference between the first feature amount and the second feature amount, and
when a machine difference variation coefficient representing a change over time in the third feature amount is outside a range of a machine difference variation coefficient threshold, the computer system newly acquires a current value of the third feature amount and recalculates the machine difference correction coefficient using the newly acquired third feature amount.

2. The correction coefficient calculation device according to claim 1, wherein
the computer system calculates, as the machine difference variation coefficient, a value representing an absolute value of a difference between an initial value acquired when the third feature amount is initially calculated and the current value of the third feature amount.

3. The correction coefficient calculation device according to claim 1, wherein
when a value representing an absolute value of a difference between an initial value acquired when the third feature amount is initially calculated and the current value of the third feature amount is outside a range of a total variation amount threshold, the computer system newly acquires a new current value of the third feature amount and recalculates the machine difference correction coefficient using the new current value of the third feature amount.

4. The correction coefficient calculation device according to claim 1, wherein
the computer system is configured to calculate the machine difference variation coefficient at predetermined time intervals, and
when the first feature amount is initially calculated after a period of time of the predetermined time intervals or more elapses from the time when the second image acquisition device initially calculates the second feature amount, the computer system calculates the machine difference correction coefficient using a value of the second feature amount acquired when the second image acquisition device initially calculates the second feature amount.

5. The correction coefficient calculation device according to claim 4, wherein
when the first feature amount is initially calculated after a period of time of the time interval or more elapses from the time when the second image acquisition device initially calculates the second feature amount, the computer system calculates the machine difference correction coefficient using not only the value of the second feature amount acquired when the second image acquisition device initially calculates the second feature amount but also the first feature amount that is initially calculated by the computer system and the second feature amount that is calculated by the second image acquisition device when the computer system initially calculates the first feature amount.

6. The correction coefficient calculation device according to claim 4, wherein
the second image acquisition device is configured to calculate a fourth feature amount of image data of a second calibration member,
the second image acquisition device is configured to calculate a second machine difference variation coefficient representing a change over time in the fourth feature amount, and
when the first feature amount is initially calculated after a period of time of the time interval or more elapses from the time when the second image acquisition device initially calculates the second feature amount, the computer system calculates the machine difference correction coefficient using not only the value of the second feature amount acquired when the second image acquisition device initially calculates the second feature amount but also the second machine difference variation coefficient acquired from the second image acquisition device.

7. The correction coefficient calculation device according to claim 1, wherein
the computer system further calculates a variation correction coefficient representing a change over time in the third feature amount as a part of the machine difference correction coefficient,
the computer system calculates a difference between the first feature amount and the second feature amount by calculating a machine difference correction value derived from the difference between the first feature amount and the second feature amount, and
after correcting the difference between the first feature amount and the second feature amount by calculating the machine difference correction value, the computer system updates the variation correction coefficient when the machine difference variation coefficient is outside the range of the machine difference variation coefficient threshold, and does not update the variation correction coefficient when the machine difference variation coefficient is within the range of the machine difference variation coefficient threshold.

8. The correction coefficient calculation device according to claim 1, wherein
the first feature amount, the second feature amount, and the third feature amount are frequency characteristics of image data.

9. The correction coefficient calculation device according to claim 1, wherein
the computer system calculates a calibration member correction coefficient for converting the third feature amount into a feature amount acquired from the reference sample using the first feature amount and the third feature amount, and
the computer system corrects the third feature amount using the calibration member correction coefficient.

10. The correction coefficient calculation device according to claim 9, wherein
the second image acquisition device is configured to calculate a fourth feature amount of image data of a second calibration member,
the second image acquisition device is configured to calculate a second calibration member correction coefficient for converting the fourth feature amount into a feature amount acquired from the reference sample using the second feature amount and the fourth feature amount,
the second image acquisition device is configured to correct the fourth feature amount using the second calibration member correction coefficient, and
the computer system calculates the machine difference correction coefficient based on a difference between the third feature amount that is corrected using the calibration member correction coefficient and the fourth feature amount that is corrected by the second image acquisition device using the second calibration member correction coefficient.

11. The correction coefficient calculation device according to claim 9, wherein
the first image acquisition device and the second image acquisition device are configured as a charged particle beam device that acquires an image of the sample by irradiating the sample with a charged particle beam, and
each of the first feature amount, the second feature amount, and the third feature amount is any one of an aperture angle of the charged particle beam, a spot diameter of the charged particle beam, or a tilt angle of the charged particle beam.

12. The correction coefficient calculation device according to claim 1, wherein
the first image acquisition device and the second image acquisition device are configured as a charged particle beam device that acquires an image of the sample by irradiating the sample with a charged particle beam.

13. A correction coefficient calculation method of calculating a machine difference correction coefficient for correcting a machine difference between image acquisition devices that acquire an image of a sample, the method comprising:
a step of calculating a machine difference correction coefficient for correcting a difference between first image data of the sample acquired by a first image acquisition device and second image data of the sample acquired by a second image acquisition device, wherein
in the step of calculating the machine difference correction coefficient, a first feature amount of image data of a reference sample that is acquired by the first image acquisition device is acquired,
in the step of calculating the machine difference correction coefficient, a second feature amount of the image data of the reference sample that is acquired by the second image acquisition device is acquired,
in the step of calculating the machine difference correction coefficient, a third feature amount of image data of a calibration member that is acquired by the first image acquisition device is acquired,
in the step of calculating the machine difference correction coefficient, the machine difference correction coefficient is calculated by calculating a correction value derived from a difference between the first feature amount and the second feature amount, and
in the step of calculating the machine difference correction coefficient, when a machine difference variation coefficient representing a change over time in the third feature amount is outside a range of a machine difference variation coefficient threshold, a current value of the third feature amount is newly acquired and the machine difference correction coefficient is recalculated using the newly acquired third feature amount.

* * * * *